United States Patent [19]

Merriaux et al.

[11] 4,365,328

[45] Dec. 21, 1982

[54] DEVICE FOR SWITCHING DIGITAL DATA

[75] Inventors: Philippe M. F. Merriaux; Jean-Yves Nicolas, both of Colombes, France

[73] Assignee: Thomson-CSF Telephone, Paris, France

[21] Appl. No.: 228,502

[22] Filed: Jan. 26, 1981

[30] Foreign Application Priority Data

Jan. 31, 1980 [FR] France .............................. 80 02088

[51] Int. Cl.³ .............................................. H04J 3/00
[52] U.S. Cl. ...................................... 370/60; 364/200
[58] Field of Search ...................... 370/60, 94; 364/200

[56] References Cited

U.S. PATENT DOCUMENTS 3,761,888  9/1973  Flynn ................................... 364/200
3,890,469  6/1975  Kelly et al. ............................ 370/60
3,979,733  9/1976  Fraser .................................. 370/60

FOREIGN PATENT DOCUMENTS 2106178  4/1972  France .

*Primary Examiner*—Jin F. Ng
*Attorney, Agent, or Firm*—Roland Plottel

[57] ABSTRACT

The device for switching digital data emitted by "n" input circuits to an output circuit comprises "n" live memories, each memory being intended to store the digital data emitted by one of the "n" input circuits, and a circuit for management of reading of the "n" live memories. The device makes it possible to restitute the data in their order of arrival at the input of the device and to prevent any conflict in the event of simultaneous emission of digital data by a plurality of input circuits.

6 Claims, 3 Drawing Figures

DEVICE FOR SWITCHING DIGITAL DATA

TECHNICAL FIELD

This invention relates to a device for switching digital data emitted by "n" input circuits to an output circuit.

A device of this type is primarily applicable to a network for switching packets of digital data in which the interface between operators (located at the nodes of the network) and within the network is constituted by "n" input circuits and by "n" output circuits, each input circuit being capable of transmitting digital data to any one of the output circuits. It is necessary in such a case to provide a device for switching digital data between the "n" input circuits and each of the "n" output circuits.

OBJECTS OF THE INVENTION

One aim of the present invention is to provide a device for switching digital data and restituting said data in their order of arrival at the input of said device.

A further aim of the present invention is to provide a digital-data switching device which makes it possible to prevent any conflict in the event of simultaneous emission of digital data by a plurality of input circuits.

SUMMARY OF THE INVENTION

In accordance with the present invention, the aims just mentioned as well as further aims are achieved by means of a device for switching digital data emitted by "n" input circuits to an output circuit, said device being provided on the one hand with "n" live memories designated as standby memories for storing respectively the digital data emitted by said input circuits at "write addresses" provided respectively by said input circuits, an output bus line connected to the outputs of said standby memories and to said output circuit, and on the other hand with a standby-memory read management circuit which in turn comprises:

"n" live memories designated as management memories for storing respectively the write addresses of said standby memories, said management memories being provided with outputs connected respectively to the read address inputs of said standby memories, and enabling inputs;

a read/write sequential addressing circuit which is common to said management memories, said circuit being write-incremented at the time of each writing by one of said input circuits into one of said standby memories and being read-incremented at the time of each reading of one of said standby memories by said output circuit;

a circuit for establishing reading priority of said standby memories and for read-blocking of said sequential addressing circuit in the event of simultaneous emission by a number of said input circuits;

a circuit for enabling one out of "n" of said management memories, the enabling operation being performed at the time of writing of said management memories by the particular input circuit which is associated with the enabled management memory and at the time of reading of said management memories by said circuit for establishing priority and blocking.

BRIEF DESCRIPTION OF THE DRAWINGS

These and other features of the invention will be more apparent upon consideration of the following description of exemplified embodiments, reference being made to the accompanying drawings in which.

DETAILED DESCRIPTION

Figure 1:
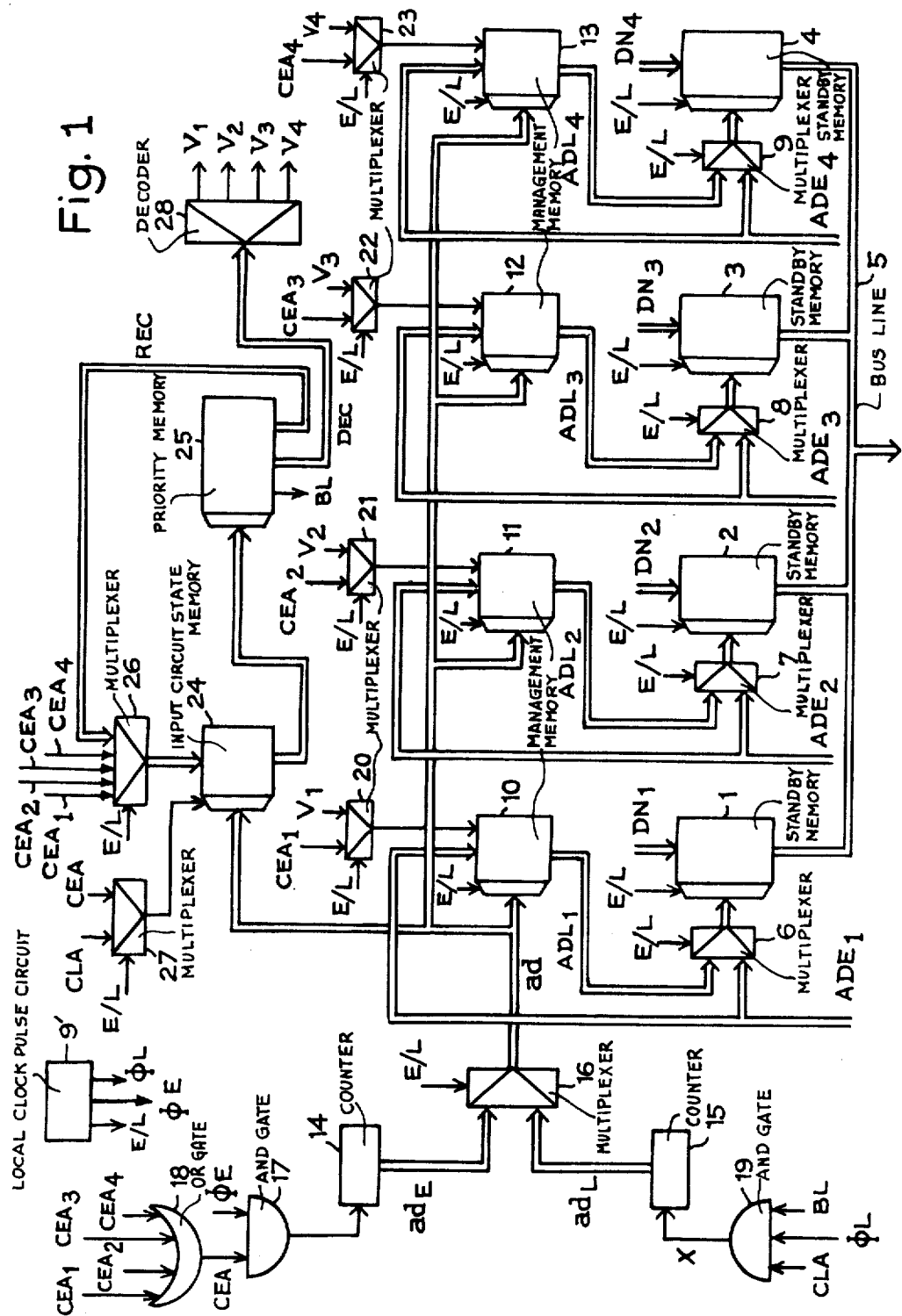
FIG. 1 is a schematic diagram showing a device in accordance with the invention for switching digital data when these latter are messages of any type and of fixed length.

By way of example, FIG. 1 provides a schematic illustration of a digital-data switching device corresponding to the case in which "n" is equal to four. The aim of this device is consequently to switch the digital data emitted by four input circuits $E_1$, $E_2$, $E_3$ and $E_4$ to an output circuit S (these circuits having been omitted from the figure).

The switching device comprises four live memories 1, 2, 3 and 4 designated as standby memories each provided with data inputs connected to first data outputs of one of the input circuits and with data outputs connected to a bus line 5 designated as the output bus line 5. The output bus line 5 is connected to the input of the output circuit S. The address inputs of the live memories 1, 2, 3 and 4 are connected respectively to the outputs of four multiplexers 6, 7, 8 and 9 designated as standby-memory addressing multiplexers. Each multiplexer 6, 7, 8 and 9 is provided with first data inputs connected to second outputs of one of the input circuits, with second data inputs and with a control input which receives a signal E/L designated as a local time-pulse signal delivered by a first output of a local clock-pulse circuit 9'. The signal E/L is also applied to the read-write selection input of the live memories 1 to 4. The live memories 1, 2, 3 and 4 are intended respectively to store the digital data $DN_1$, $DN_2$, $DN_3$ and $DN_4$ emitted by the input circuits $E_1$, $E_2$, $E_3$ and $E_4$ and available on the first outputs of said circuits. The digital data $ADE_1$, $ADE_2$, $ADE_3$ and $ADE_4$ which are available on the second outputs of each input circuit represent the write address (in the standby memory associated with said input circuit) of the digital data which are available on the first outputs of this circuit. It is therefore assumed that management of writing of the standby memories is carried out by the input circuits.

The digital-data switching device also comprises a circuit for management of reading of the standby memories. The standby-memory reading management circuit comprises four live memories 10, 11, 12 and 13 designated as management memories, said memories being each provided with data inputs connected to the second outputs of one of the input circuits and with outputs connected to the second data inputs of one of the multiplexers 6 to 9. The outputs of the management memories 10 to 13 deliver data $ADL_1$ to $ADL_4$ representing the read address of the standby memories 1 to 4. The address inputs of the memories 10 to 13 are connected to the outputs of a read/write sequential addressing circuit which is common to the memories 10 to 13.

Said sequential addressing circuit comprises a counter 14 designated as a write-addressing counter, a counter 15 designated as a read-addressing counter and a multiplexer 16 designated as a management-memory addressing multiplexer. The counter 14 is provided with a clock input which is connected to the output of an AND-gate 17 having two inputs. A first input of the AND-gate 17 reeives a signal $\phi_E$ designated as a counter-incrementation control signal delivered by a second output of the circuit 9'. A second input of the AND-gate 17 receives the output signal CEA of an OR-gate 18 provided with four inputs each connected to a third output of one of the input circuits and adapted to deliver respectively the signals $CEA_1$, $CEA_2$, $CEA_3$ and $CEA_4$ or so-called standby-memory write control signals.

The counter 15 is provided with a clock input which is connected to the output of an AND-gate 19 having three inputs. A first input of the AND-gate 19 receives a signal $\phi_L$ or so-called counter-incrementation control signal 15 delivered by a third output of the circuit 9'. A second input of the AND-gate 19 receives a signal CLA or so-called standby-memory read control signal delivered by the output circuit.

The multiplexer 16 is provided with first data inputs connected to the outputs of the counter 14, with second data inputs connected to the outputs of the counter 15 and with a control input which receives the signal E/L.

The outputs of the counter 14 deliver data $ad_E$ representing the write address of the management memories; the outputs of the counter 15 deliver data $ad_L$ representing the read address of the management memories; and the outputs of the multiplexer 16 deliver data ad representing the address of the management memories at a given instant. Since the management memories have a common addressing circuit, each management memory 10 to 13 is also provided with an enabling input connected to the output of one of the multiplexers 20 to 23 which form an enabling circuit for one management memory out of "n". Each multiplexer 20 to 23 is provided with a first data input connected to the third output of one of the input circuits, with a second data input, and with a control input which receives the signal E/L.

The device for management of reading of the standby memories further comprises a circuit for establishing reading priority of the standby memories and blocking the read-addressing of the management memories in the event of simultaneous emission by the n input circuits, this circuit being designated hereinafter as a priority-establishing and blocking circuit.

The priority-establishing and blocking circuit comprises a live memory 24 designated as an input-circuit state memory, a dead memory 25 designated as a priority memory, a multiplexer 26 designated as a state-memory writing multiplexer, a multiplexer 27 designated as a state-memory read/write selection multiplexer and a decoder 28.

The state memory 24 is provided with address inputs connected to the outputs of the multiplexer 16, with data inputs connected to the outputs of the multiplexer 26 and with outputs connected to the address inputs of the dead memory 25. The dead memory 25 is provided with outputs which are arranged as first, second and third outputs for delivering three different types of data: REC, DEC and BL. The multiplexer 26 is provided with first data inputs connected to the first outputs of the dead memory 25, with second data inputs which receive the signals $CEA_1$ to $CEA_4$, and a control input which receives the signal E/L. The live memory 24 is also provided with a read/write selection input which is connected to the output of the multiplexer 27. Said multiplexer 27 is in turn provided with a first data input which receives the signal CEA, with a second data input which receives the signal CLA, and with a control input which receives the signal E/L.

The decoder 28 is provided with data inputs connected to the second outputs of the memory 25, with a first output, second output, third output and fourth output which are connected respectively to the second data input of the multiplexers 20 to 23 and deliver respectively the signals $V_1$, $V_2$, $V_3$, $V_4$ designated as management-memory read-enable signals.

The third output of the memory 25 is connected to the third input of the AND-gate 19; said third input constitutes the blocking input of the read sequential address circuit.

Figure 2:
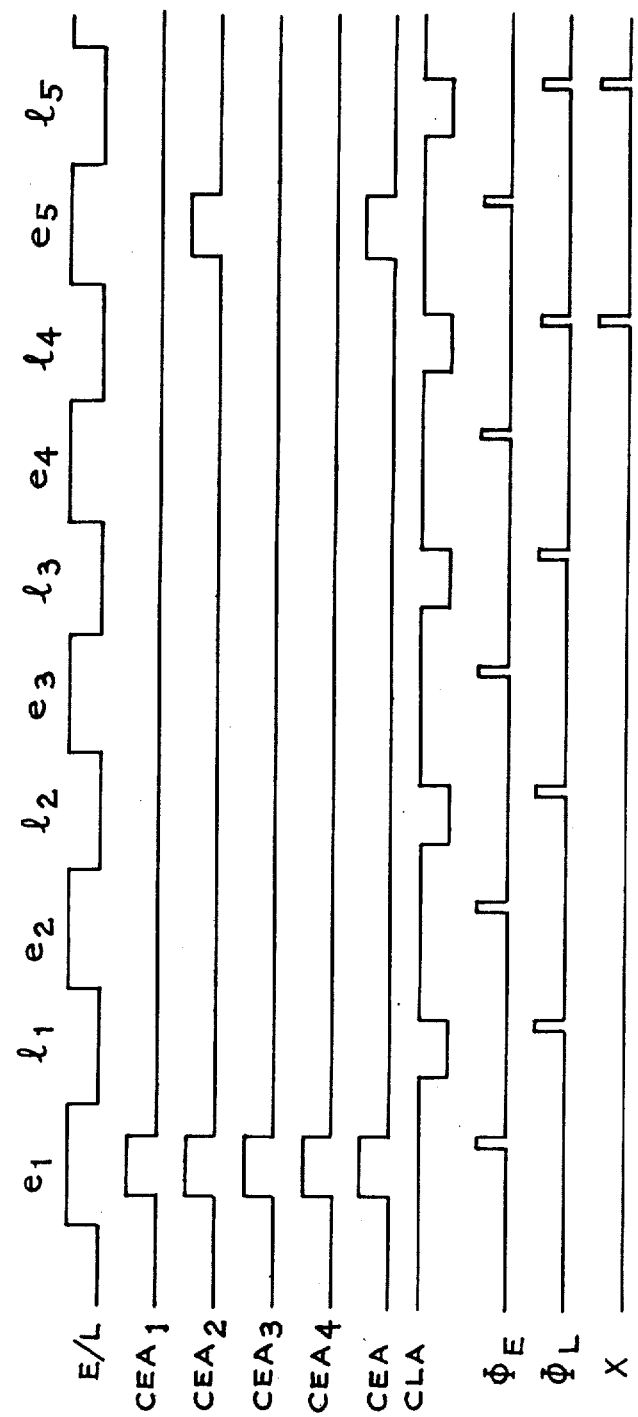
FIG. 2 is a waveform diagram in which the shapes of the signals appearing in FIG. 1 are represented as a function of time.

The operation of the digital-data switching device shown in FIG. 1 will now be described with reference to FIG. 2 and with the aid of the example which now follows. It will be assumed that a first emission of the input circuits during which the input circuits $E_1$, $E_2$, $E_3$ and $E_4$ transmit digital data simultaneously to the output circuit is followed by a second emission during which the input circuit $E_2$ alone transmits digital data to the output circuit. During the first emission of the input circuits, the signals $CEA_1$, $CEA_2$, $CEA_3$, $CEA_4$ and consequently the signal CEA are active or in other words brought in this case to the logic level "1". The emission of the input circuits must be located within the write phase e of the signal E/L as represented in the figure by the logic level "1".

Similarly, the signal CLA which causes the output circuit to initiate reading of the standby memories must be active (or in other words have a logic level "0" in this case) within the read phase 1 of the signal E/L as represented by a logic level "0". In contrast to the signal CEA, the signal CLA is periodic.

During the write phase $e_1$, the digital data $DN_1$ to $DN_4$ are written into the standby memories 1 to 4 and the write addresses $ADE_1$ to $ADE_4$ of said digital data are written into the management memories 1 to 4 at an address $ad_E$ (these memories being all write-enabled by the signals $CEA_1$ to $CEA_4$). At the same time, the values of the signals $CEA_1$ to $CEA_4$ (in this case the binary word designated as a state word "1111") are written into the state memory 24 (the multiplexer 26 selects these data since the write phase is at present taking place). At the end of the write phase $e_1$, the counter 14 is incremented by means of the signal $\phi_E$ which then produces a pulse and its contents accordingly change to the value "$ad_E+1$".

During the read phase $1_1$, the state word "1111" is first read in the state memory (the state memory 24 being read-enabled by the signal CLA which has a logic level "0"). The state word "1111" is employed for addressing the dead memory 25; this latter then supplies the decoder 28 with data such as, for example, the data "oo" which indicate that reading priority is given to the first standby memory. Accordingly, only the signal $V_1$ delivered by the output of the decoder 28 will be active, with the result that only the management memory 10 will be enabled and only the standby memory 1 will be read (whereupon the data emitted by the input circuit $E_1$ are received by the output circuit in an initial stage).

The dead memory 25 also supplies the multiplexer 26 with the state word to be re-written instead of the word "1111" which will in this case be the word "0111". This word (which is selected by the multiplexer 26 during phase $1_1$) is written into the state memory between the end of phase $1_1$ and the beginning of phase $e_2$, that is to say when the signal CLA presents a logic level "1". And this word is written at the same address as the preceding state word "1111" since incrementation of the counter 15 is inhibited by means of the signal BL (having a binary value "0") delivered by the dead memory 25. At the time of the write phase $e_2$, no writing operation is effected in the state memory since the signal CEA remains at the logic level "0".

At the time of the read phase $1_2$, the word "0111" is then in turn employed for addressing the dead memory 25; this latter then supplies the decoder 28 with the data "01" which make it possible in a second stage to switch the data emitted by the input circuit $E_2$ to the output circuit S. The dead memory 25 also delivers the re-write word "0011" to the state memory. The dead memory 25 also delivers a signal BL which is always at the logic level "0", thus making it possible to read all the management memories at the same address or in other words to read into the standby memories data which have been emitted simultaneously by the input circuits. The state word "0011" is written into the state memory between the end of phase $1_2$ and the beginning of phase $e_3$ (whereupon the signal CLA assumes a logic level "1"). During phase $e_3$, no writing operation is carried out in the state memory since the signal CEA remains at the logic level "0".

Thereupon, at the time of the read phase $1_3$, the word "0011" is in turn employed for addressing the dead memory 25; this latter then supplies the decoder 28 with data "10" which make it possible in a third stage to switch the data emitted by the input circuit $E_3$ to the output circuit 5. The dead memory 25 also supplies the state memory with the re-write word "0001" and delivers to the AND-gate 19 a signal BL which is still at the logic level "0". The state word "0001" is written into the state memory between the end of phase $1_3$ and the beginning of phase $e_4$. During phase $e_4$, no writing operation is performed in the state memory since the signal CEA remains at the logic level "1".

During the read phase $1_4$, the word "0001" is then in turn employed for addressing the dead memory 25; this latter then supplies the decoder 28 with data "11" which make it possible in a fourth stage to switch the digital data emitted by the input circuit $E_4$ to the output circuit 5. The dead memory 25 also supplies the state memory with the re-write word "0000" and delivers to the AND-gate 19 a signal BL which is this time at the logic level "1". Thus, when the read phase $1_4$ has been completed, the counter 15 can be incremented by means of the output signal X of the AND-gate 19 which then produces a pulse. During the next read phase, the data stored within the state memory and within the management memories will be read at the address "$ad_1+1$". It is therefore apparent from this example that, by means of the priority-establishing and blocking circuit, the digital data emitted simultaneously by a plurality of input circuits are restituted successively by the switching device in an order which is arbitrarily established by the user. This accordingly makes it possible to prevent any conflict in the event of simultaneous emission by a number of input circuits. The same reasoning may be adopted when the number of simultaneously-emitting input circuits is no longer equal to n but smaller than n. Programming of the dead memory 25 can thus be established as shown in the table below. In this table, the program is also given by way of example since it corresponds to the case in which n is equal to four and in which it is assumed that the input circuit $E_i+1$ has priority over the input circuit $E_i$.

| ADDRESS | REC | DEC | BL |
|---------|------|-----|----|
| 0000 | X | X | X |
| 0001 | 0000 | 11 | 1 |
| 0010 | 0000 | 10 | 1 |
| 0011 | 0001 | 10 | 0 |
| 0100 | 0000 | 01 | 1 |
| 0101 | 0001 | 01 | 0 |
| 0110 | 0010 | 01 | 0 |
| 0111 | 0011 | 01 | 0 |
| 1000 | 0000 | 00 | 1 |
| 1001 | 0001 | 00 | 0 |
| 1010 | 0010 | 00 | 0 |
| 1011 | 0011 | 00 | 0 |
| 1100 | 0100 | 00 | 0 |
| 1101 | 0101 | 00 | 0 |
| 1110 | 0110 | 00 | 0 |
| 1111 | 0111 | 00 | 0 |

The symbol X means that no data item is stored at this address.

During the write phase $e_5$ corresponding to the second emission, the digital data emitted by the input circuit $E_2$ are stored in the standby memory 2, the write address in the standby memory 2 is stored in the management memory 11 (at the address "$ad_E+1$"), and the state word "0100" is stored in the state memory 24, also at the address "$ad_E+1$". At the end of the write phase $e_5$, the counter 14 is incremented and then delivers the address "$ad_E+2$" which will be employed at the time of the write phase corresponding to the next emission. During the read phase $1_5$ corresponding to the second emission, the word "0100" is first read from the state memory and is employed for addressing the dead memory 25. The dead memory 25 supplies the decoder 28 with data "01" for enabling the management memory 11 and therefore switching the digital data emitted by the input circuit $E_2$ to the output circuit. The dead memory 25 also supplies the state memory 24 with the re-write word "0000" and delivers to the AND-gate a signal BL having the logic level "1". Thus, at the end of the read phase $1_5$, the counter 15 is incremented and then delivers the address "$ad_E+2$" which will be employed at the time of the next read phase.

As a result of incrementation of the counters 14 and 15, respectively at the end of the write and read phases, the switching device restitutes the digital data in their order of arrival at the input of said device.

Figure 3:
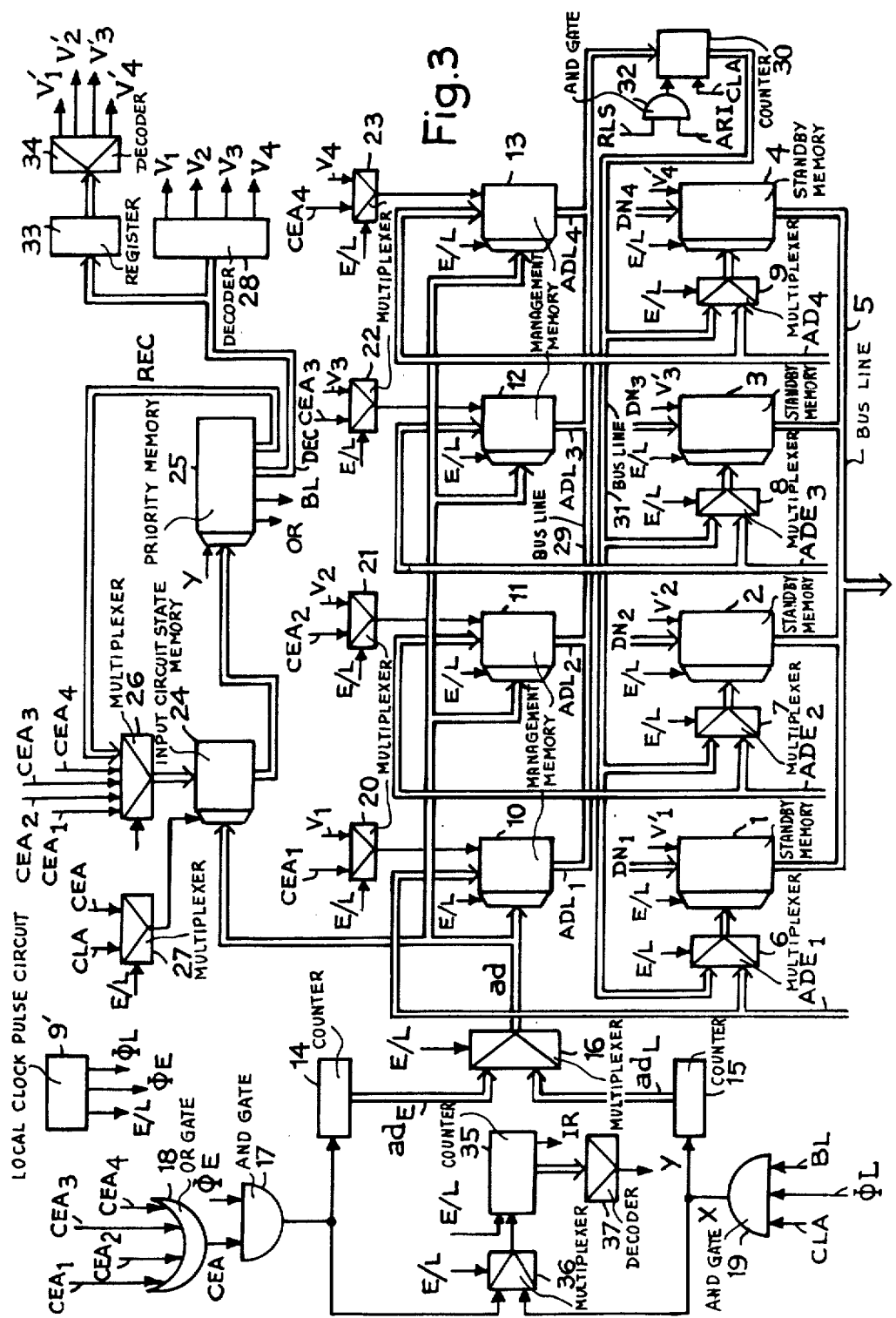
FIG. 3 is a schematic diagram of a digital-data switching device in accordance with the invention when said data are packets of variable length.

In FIG. 3, which corresponds to the case in which the digital data to be switched are packets of variable length, the same elements as in FIG. 1 are again shown (and designated by the same references) with the following additions and modifications.

The outputs of the management memories 10, 11, 12 and 13 are no longer respectively coupled to the second inputs of the multiplexers 6, 7, 8 and 9 but to a bus line 29 which is in turn connected to the loading inputs of a counter 30. The outputs of the counter 30 are connected to a bus line 31 which is in turn connected to the second data inputs of the multiplexers 6, 7, 8 and 9. The signal CLA is applied to the loading control input of the counter 30. The clock input of the counter 30 is connected to the output of an AND-gate 32 having two inputs. A first input of the AND-gate 32 receives a read time-pulse signal RLS via the output circuit from the packets stored in the standby memories. A second input of the AND-gate 32 receives a signal ARI for stopping the incrementation of the counter 30, said signal being delivered by the output circuit (for example upon detection of a binary element which indicates the end of the packet).

Since the standby memories 1, 2, 3 and 4 are now addressed in writing by the same address (delivered by the bus line 30), said memories must be enabled separately. To this end, provision is made for a register 33 provided with inputs connected to the second outputs of the dead memory 25 and for a decoder 34 provided with inputs connected to the outputs of the register 33 and with four outputs for delivering respectively the signals $V'_1$, $V'_2$, $V'_3$ and $V'_4$. The signals $V'_1$, $V'_2$, $V'_3$ and $V'_4$ are applied respectively to the output-enabling inputs of the memories 1, 2, 3 and 4.

Moreover, since the packets emitted by the input circuits have variable lengths, the counters 14 and 15 can be incremented at different rates. In order to prevent standby-memory reading or writing overlaps which may otherwise occur, provision is made for a counter 35 having a clock input connected to the output of a multiplexer 36; said multiplexer is in turn provided with a first data input connected to the output of the AND-gate 17, with a second data input connected to the output of the AND-gate 19 and with a control input which receives the signal E/L. The input for controlling the direction of counting of the counter 35 receives the signal E/L, with the result that the counter 35 is incremented by the clock of the counter 14 and decremented by the clock of the counter 15.

The outputs of the counter 35 are connected to a decoder 37 which detects the value "0" of the outputs of the counter 37 and delivers an additional binary addressing element Y to the dead memory 25. The memory 25 is provided with an additional output which delivers a signal OR to the output circuit. Said signal OR indicates to the output circuit whether read data are available in the standby memories.

The borrow output of the counter 35 also delivers a signal IR to the input circuits in order to indicate whether standby-memory locations are available for receiving write data. The device for switching packets of variable lengths described in FIG. 3 operates in the following manner.

The input circuits deliver only start-of-packet addresses ($ADE_1$, $ADE_2$, $ADE_3$ and $ADE_4$), thus permitting a fairly considerable reduction in size of the management memories. Since the start-of-packet address is known, the counter 30 makes it possible to generate the data addresses constituting the remainder of the packet as long as the output circuit has not detected in the standby memories a message which indicates the end of the packet (the incrementation-stopping signal ARI being active when the output circuit detects said message).

If the packets written into the standby memories during a predetermined time interval are shorter than the packets read from the standby memories (that is, shorter than the packets written during the preceding time interval), the counter 14 is incremented at a higher rate than the counter 15. It may then happen that the counter 35 reaches its maximum value which is equal to the capacity of the management memories (counter overflow). In this case, the signal IR indicates for example to the input circuits that priority is given to reading of the standby memories.

On the other hand, if the packets read from the standby memories during a predetermined time interval are shorter than the packets written into the standby memories, the counter 15 is incremented at a higher rate than the counter 14. It may then happen that the counter 35 reverts to the value "0" (return of counter to zero). In this case, the signal Y delivers the signal OR together with the address of the dead memory 25 delivered by the memory 24. If the address delivered by the memory 24 is constituted by the state word "0000", the signal IR indicates to the output circuit that the standby memories are vacant. On the other hand, if the address delivered by the memory 24 is not constituted by the state word "0000", this means that a certain number of standby memories are not yet vacant since a cycle of reading of packets which have been emitted simultaneously by a plurality of input circuits is in progress.

What is claimed is:

1. A device for switching digital data emitted by "n" input circuits to an output circuit, comprising on the one hand "n" live memories designated as standby memories for storing respectively the digital data emitted by said input circuits at write addresses provided respectively by said input circuits, an output bus line connected to the outputs of said standby memories and to said output circuit, and on the other hand a standby-memory read management circuit which in turn comprises:

"n" live memories designated as management memories for storing respectively the write addresses of said standby memories, said management memories being provided with outputs connected respectively to read address inputs of said standby memories;

a read/write sequential addressing circuit which is common to said management memories, said circuit being write-incremented at the time of each writing by one of said input circuits into one of said standby memories and being read-incremented at the time of each reading of one of said standby memories by said output circuit;

a circuit for establishing reading priority of said standby memories and for read-blocking of said sequential addressing circuit in the event of simultaneous emission by a number of said input circuits;

a circuit for enabling one out of "n" of said management memories, the enabling operation being performed at the time of writing of said management memories by the particular input circuit which is associated with the enabled management memory and at the time of reading of said management memories by said circuit for establishing priority and blocking.

2. A device according to claim 1, wherein said input circuits deliver respectively a control signal for writing into said standby memories, wherein said output circuit delivers a read control signal for reading said standby memories, and wherein said read/write sequential addressing circuit comprises:

an OR-gate which receives said write control signals from said input circuits;

a write-addressing counter incremented by the output signal of said OR-gate;

a read-addressing counter incremented by said read control signal from said output circuit and provided with a blocking input;

a local clock for delivering a local time-pulse signal;

a multiplexer for addressing said management memories, said multiplexer being provided with first data inputs connected to the outputs of said write-addressing counter, with second data inputs connected to the outputs of the read-addressing counter, with a control input which receives said local time-pulse signal, and with outputs connected to the address inputs of said management memories.

3. A device according to claim 2, wherein said priority-establishing and blocking circuit comprises:
 a live memory designated as a state memory provided wih address inputs connected to the outputs of said sequential addressing circuit and with a read-write selection input;
 a multiplexer for read-write selection of said state memory, said multiplexer being provided with a first data input which receives the output signal from said OR-gate, with a second data input which receives said read control signal from said output circuit, with a control input which receives said local time-pulse signal, and with an output connected to the read-write selection input of said state memory;
 a multiplexer for writing into said state memory, said multiplexer being provided with first data inputs for receiving said write control signals from said input circuits, with second data inputs and with a control input for receiving said local time-pulse signal;
 a dead memory designated as a priority memory provided with address inputs connected to the outputs of said state memory, with first outputs connected to said second data inputs of said state-memory writing multiplexer, with second outputs and with a third output connected to said blocking input of said read-addressing counter;
 a decoder provided with inputs connected to said second outputs of said priority memory and with "n" outputs connected to said circuit for enabling one out of "n" of said management memories.

4. A device according to claim 3, wherein said circuit for enabling one out of "n" of said management memories comprises "n" multiplexers provided respectively with first data inputs which receive respectively said write control signals from said input circuits, with second data inputs connected respectively to the outputs of said decoder, with control inputs which receive said local time-pulse signal, and with outputs connected respectively to said management-memory enabling inputs.

5. A device according to claim 1, wherein said digital data to be switched are constituted by packets, said input circuits being adapted to deliver only the start-of-packet addresses, the device further comprising a counter controlled and incremented by said output circuit, the outputs of said management memories being connected to the read address inputs of said standby memories via said counter.

6. A device according to claim 2, wherein said digital data to be switched are constituted by packets of variable length, and wherein a circuit is provided for inhibiting read and write overlap in said standby memories, wherein said overlap-inhibiting circuit comprises a counter which is incremented each time said write-addressing counter of said management memories is incremented and which is decremented each time said read-addressing counter of said management memories is incremented, overflow of said counter being indicated to said input circuits and return-to-zero of said counter being indicated to said output circuit.

* * * * *